2 Sheets—Sheet 1.

T. A. EDISON.
Phonograph.

No. 227,679. Patented May 18, 1880.

Witnesses.
Harold Serrell
Chas H Smith

Inventor
Thomas A. Edison
per Lemuel W. Serrell
atty

2 Sheets—Sheet 2.

T. A. EDISON.
Phonograph.

No. 227,679. Patented May 18, 1880.

Witnesses.
Harold Serrell
Chas. H. Smith

Inventor
Thomas A. Edison
per Lemuel W. Serrell
Atty

UNITED STATES PATENT OFFICE.

THOMAS A. EDISON, OF MENLO PARK, NEW JERSEY.

PHONOGRAPH.

SPECIFICATION forming part of Letters Patent No. 227,679, dated May 18, 1880.

Application filed March 29, 1879.

*To all whom it may concern:*

Be it known that I, THOMAS ALVA EDISON, of Menlo Park, in the State of New Jersey, have invented an Improvement in Phonographs, (Case No. 174,) of which the following is a specification.

In Letters Patent No. 200,521, granted to me, a cylinder with a helical-grooved surface is revolved with its screw-shaft and moved along endwise. Upon this cylinder there is a sheet of foil or similar material, and the same is indented by the action of a point moved by a diaphragm, and this foil forms a phonogram that can be used to reproduce the original sounds when moved in contact with a point and diaphragm. In the said patent one of the points is shown as connected directly to the diaphragm, and the other point is upon a spring.

My present invention relates to improvements upon the phonograph patented as aforesaid, and the features of such improvement are hereinafter specially pointed out.

Figure 1:
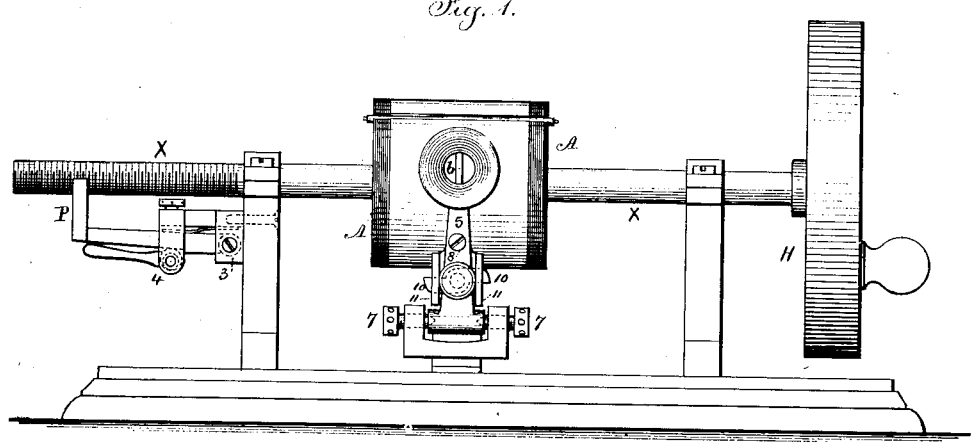
Figure 2:
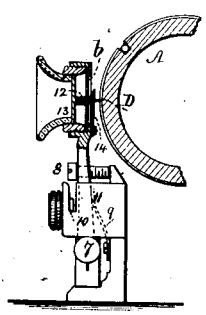
Figure 4:
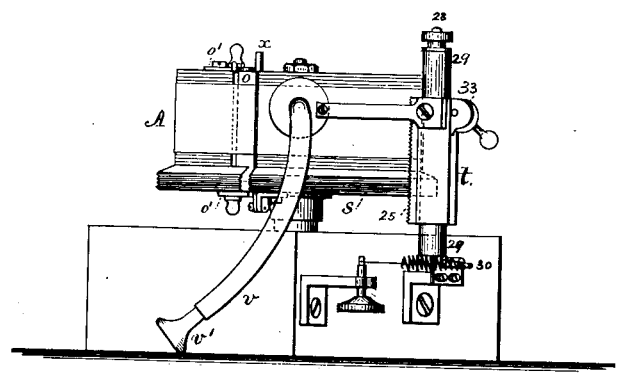
Figure 3:
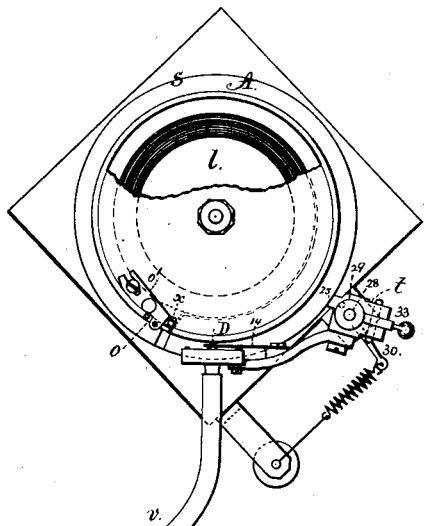

In the drawings, Figure 1 is an elevation of the phonograph. Fig. 2 is a section of the diaphragm. Fig. 3 is an end view of the cylinder containing the foil. Fig. 4 is a side view of the diaphragm and the device for moving the same.

The cylinder A has a grooved surface, as in aforesaid patent, and it receives the tin-foil or other material that is to be indented by the action of the diaphragm *b* and point to produce the record of the sound, which I term the "phonogram," and the diaphragm E and point D are adapted to form a phonet and reproduce the sound; but it is to be understood that the same point and diaphragm may be employed to record and to reproduce the sound.

In my present invention, as in my former patent, the motion of the recording-surface may be derived from clock-work, hand, or other power.

In order to insure great uniformity of speed and prevent irregularity in the movement by inaccuracies of work, dust, lack of oil, or any other source of local friction or resistance, I make use of an abnormally heavy fly-wheel, H, upon the shaft of the phonograph, so as to prevent any trembling movement and to resist any tendency to increase or lessen the speed, for upon uniformity of speed of the phonet with the phonograph depends the accuracy of reproduction, especially in musical sounds, that depend for their tone upon the number of vibrations per second.

The nut P is upon a lever pivoted at 3 and kept in contact by a cam, 4. When this lever and nut P are lowered the shaft X and cylinder A can be slipped endwise.

The arm 5, carrying the diaphragm *b*, should be pivoted at 7 7 by pointed screws, so as to adjust the position of the recording-point of the diaphragm *b* relatively to the grooves of the cylinder. The screw 8 determines the position to which the diaphragm and recording-point may approach to the cylinder. The spring 9 serves to move the arm 5 away from the cylinder, and the double-ended locking-piece 10, entering slots in the frame 11, holds the arm in place when in use.

One of the peculiarities of the present invention over the aforesaid patent is a spring, 12, of india-rubber or other suitable material, placed between the cross-bar or bridge 13 and the diaphragm, that serves as a damper to prevent false vibrations of the diaphragm and cause it to respond only to the actual movement given by the phonogram through the point D. It is also usually preferable to employ a spring, 14, between the point and the diaphragm. This is useful, in both the phonograph and the phonet, to prevent false sounds. This spring and diaphragm I have used in connection with telephones. I do not, therefore, herein lay claim to the same, broadly. I have combined the same with the recording or phonet point and the phonogram.

Figure 5:
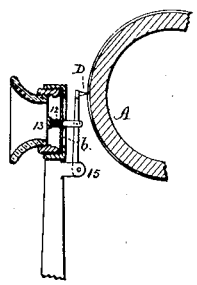
Figure 6:
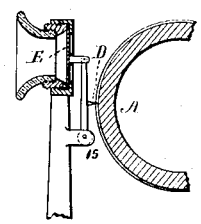

Another feature of invention relates to a lever between the diaphragm and the phonogram, whereby the relative movements of the parts may be varied. This lever *e* has a fulcrum at 15. If the connection to the diaphragm is between the point D and fulcrum 15, as in Fig. 5, then the motion of the point will be greater than the diaphragm, and when used in the phonograph will amplify the indentations in the foil. If used in the phonet, the movement of the diaphragm would be lessened. I therefore prefer, in that instrument, to change the places of the point and diaphragm connection, as shown in Fig. 6, so as to amplify the movement of the diaphragm and increase the sound.

Another feature of my present invention relates to the foil-holder, which I place on a reel within the cylinder A, and draw the same out through a slot, as required from time to time, thus preserving the foil from injury and rendering it unnecessary to handle the same.

Figure 7:
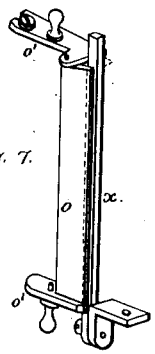

The reel $l$ within the cylinder A is adapted to receive the foil in a roll upon it. One head of the cylinder is removable, so as to allow of the insertion or withdrawal of the reel. There is a slot in the cylinder, through which the foil is brought out, and there is a bar, $o$, forming part of the periphery of the cylinder, that is connected at its ends to the slides $o'$, (see Fig. 7,) one at each end of the cylinder, and there is a lever-bar, $x$, behind this slide-bar $o$. When the slide $o'$ is drawn back from over the lever $x$, such lever can be swung out of the slot in the cylinder A, and the foil can be drawn out of the slot and wrapped around the cylinder, and then the end is placed behind the bar $x$, and carried by it into the slot of the cylinder, and then the slide $o'$ is moved so that its edge passes over the lever $x$, and in so doing the foil is tightened around the cylinder and the lever $x$ held in place. The surface of this cylinder is made with a helical groove, and the rim $s$ of the cylinder is made with a similar screw or groove, and the sliding sleeve $t$, that carries the diaphragm-arm, has a screw-surface at 25, that comes into contact with the screw $s$.

With this character of instrument it is preferable to have the cylinder A upon a vertical shaft, and the sleeve $t$ and diaphragm will be moved vertically. For this purpose the fixed stud 28 is vertical, and upon it is a tube, 29, of a size to receive the sleeve $t$, and having a groove and key, by which the sleeve $t$ is allowed to slide endwise of the tube 29; but the two can be turned together on the stud or shaft 28. An arm, 30, on the tube 29, and a spring, serve to turn the tube, the sleeve, and the diaphragm and arm with sufficient force to bring the point D to bear upon the foil with the required force.

It is preferable to employ with the diaphragm a tube, $r$, and mouth-piece $v'$, such tube being flexible.

The speaking into and recording of the sounds in the phonograph will be proceeded with as usual, and the reproduction of the sounds will be as before; but in case the operator wants to suspend the recording in the phonograph or the speaking in the phonet he simply has to draw upon the flexible tube, which swings the parts so as to disconnect the screw-rack from the flange $s$ of the cylinder. This at the same time moves away the recording or the phonet point. The cylinder A can continue to revolve, and when the operator is ready he releases the pull upon the flexible tube, and the parts commence to act again at the exact place where the operation was suspended, because the screw-threads will only drop together when the proper part of the thread $s$ comes to the corresponding part on the rack 25.

I employ the cam 33 and its lever upon the sleeve $t$ to act upon the tube 29 and prevent the sleeve falling when the screw-threads are disconnected. This cam-lever 33 is self-acting, and it has to be raised when the sleeve $t$ is to be lowered, so as to recommence at one end of the cylinder A.

By simply turning the sleeve and moving the diaphragm and the screw-surface back, the sleeve and diaphragm can be slipped endwise to any desired place upon the cylinder A to receive or deliver sounds.

I am aware that fly-wheels are employed in numerous ways for equalizing the speed of machinery. I do not claim the same, broadly. In experimenting with my phonograph I discovered that the reproduction of the sound was imperfect if the slightest variation occurred in the speed; hence the combination with the cylinder of a very heavy fly-wheel in proportion to the cylinder rendered perfect and reliable the action of the instrument in receiving and reproducing the sound by equalizing the speed.

I claim as my invention—

1. The combination, with the phonograph cylinder, shaft, and screw-surface, of a swinging nut or screw-surface, to connect or disconnect the parts that keep the recording or phonet point in position relative to the groove of the cylinder, substantially as set forth.

2. In combination with foil or a sound-recording surface, a point, a diaphragm, and a spring or damper acting to press the diaphragm toward the point, substantially as set forth.

3. In combination with a foil or sound-recording surface, a point, a diaphragm, and a spring between the point and the diaphragm, substantially as set forth.

4. The combination, in a phonograph or phonet, of a diaphragm, a point, and a lever intervening between the diaphragm and the point, substantially as set forth.

5. The combination, with the spirally-grooved cylinder in a phonograph, of a reel within the cylinder carrying the foil or similar recording material, a slot in the cylinder, through which the foil is led out, and means for clamping the foil, substantially as set forth.

6. The combination, with the cylinder A, of the sliding bar $o$ and lever $x$, to clamp the foil and stretch the same, substantially as set forth.

7. The swinging sleeve $t$, having an arm that carries the diaphragm, in combination with the cylinder A, and rim $s$, having a screw-thread surface, substantially as set forth.

8. The tube 29 upon the fixed stud 28, in combination with the sliding sleeve $t$, the diaphragm, and the cylinder A. substantially as described and shown.

Signed by me this 19th day of March, 1879.

THOMAS A. EDISON.

Witnesses:
S. L. GRIFFIN,
WM. CARMAN.